United States Patent [19]

Eisinger et al.

[11] Patent Number: 5,034,479

[45] Date of Patent: Jul. 23, 1991

[54] PROCESS FOR REDUCING SHEETING DURING POLYMERIZATION OF ALPHA-OLEFINS

[75] Inventors: Ronald S. Eisinger, Charleston; Mark G. Goode, Saint Albans; Daniel M. Hasenberg, Hurricane; Kiu H. Lee, South Charleston, all of W. Va.

[73] Assignee: Union Carbide Chemicals and Plastics Technology Corporation, Danbury, Conn.

[21] Appl. No.: 559,699

[22] Filed: Jul. 30, 1990

Related U.S. Application Data

[63] Continuation of Ser. No. 111,450, Oct. 22, 1987, abandoned.

[51] Int. Cl.$^5$ .................... C08F 2/34; C08F 10/02
[52] U.S. Cl. .......................... 526/68; 526/69; 526/74; 526/138; 526/348.6; 526/348.5; 526/901
[58] Field of Search .............................. 526/68, 69, 74

[56] References Cited

U.S. PATENT DOCUMENTS

| | | | |
|---|---|---|---|
| 4,508,842 | 4/1985 | Beran et al. | 526/129 |
| 4,518,750 | 5/1985 | Govoni et al. | 526/68 |
| 4,525,547 | 6/1985 | Kato et al. | 526/901 |
| 4,532,311 | 7/1985 | Fulks et al. | 526/901 |
| 4,642,328 | 2/1987 | Morteral et al. | 526/903 |
| 4,855,370 | 8/1989 | Chirillo et al. | 526/901 |

FOREIGN PATENT DOCUMENTS 709470 5/1965 Canada.
3888 10/1984 World Int. Prop. O..

Primary Examiner—Edward J. Smith
Attorney, Agent, or Firm—Clement J. Vicari

[57] ABSTRACT

A process for reducing sheeting during gas phase polymerization of alpha-olefins utilizing catalysts prone to cause sheeting wherein the gaseous feed stream containing monomer comonomer hydrogen and inert gas is introduced into the reactor through the recycle stream to the reactor at a point prior to cooling the recycle stream.

6 Claims, 1 Drawing Sheet

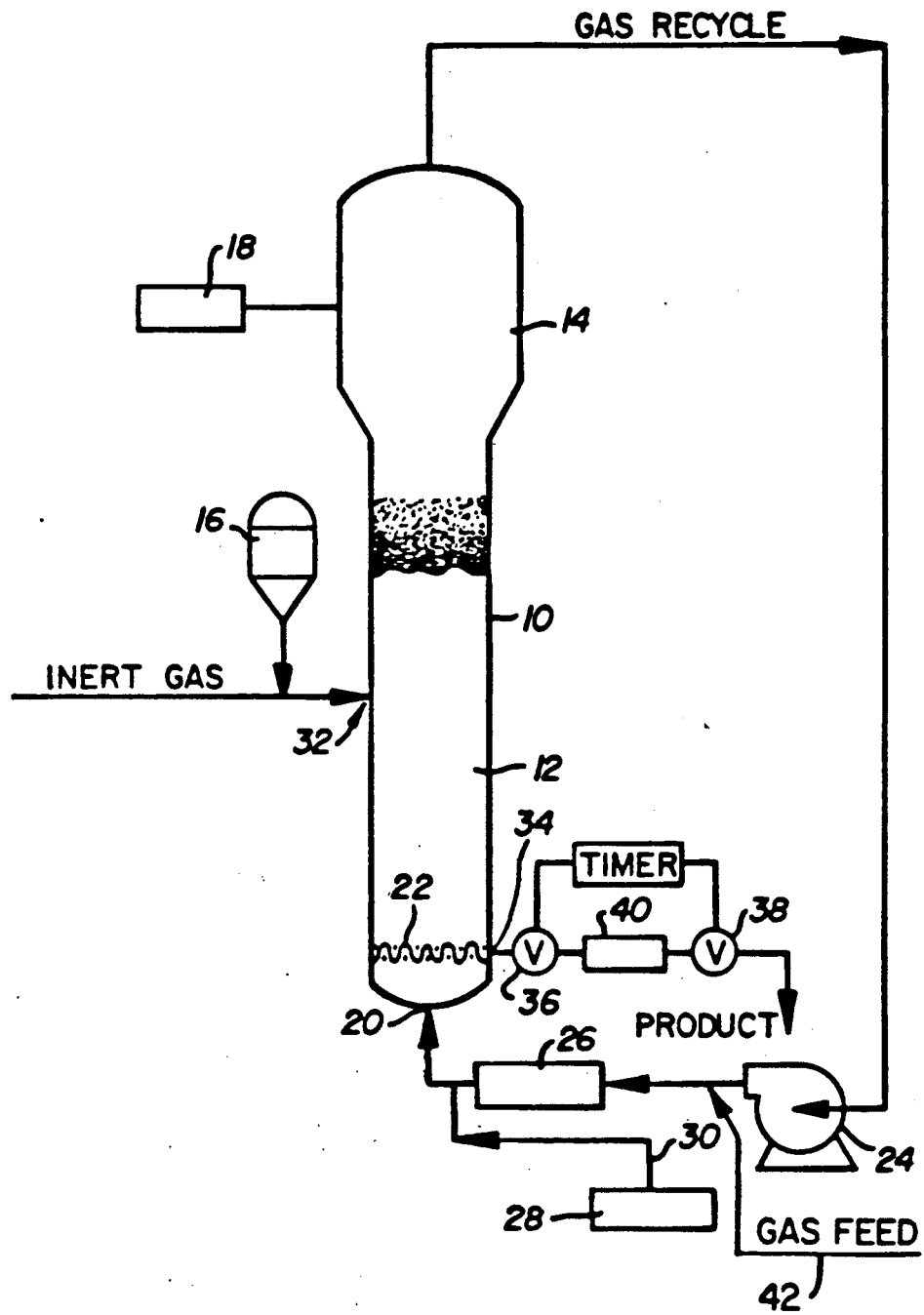

PROCESS FOR REDUCING SHEETING DURING POLYMERIZATION OF ALPHA-OLEFINS

This application is a continuation of application Ser. No. 111,450 filed Oct. 22, 1987, now abandoned.

BACKGROUND OF THE INVENTION

1. Field of the Invention

The present invention relates to a process for reducing sheeting during polymerization of alpha-olefins and more particularly to a process for reducing sheeting during polymerization of ethylene.

2. Summary of the Prior Art

As is well known to those skilled in the art, low pressure, high or low density polyethylenes can now be conventionally provided by a fluidized bed process utilizing several families of catalysts to produce a full range of low density and high density products. The appropriate selection of catalysts to be utilized depends in part upon the type of end product desired, i.e., high density, low density, extrusion grade, film grade resins and other criteria and are generally described e.g., in U.S. Pat. No. 4,532,311 issued on July 30, 1985.

In general, the above catalysts are introduced together with the polymerizable materials, into a reactor having an expanded section above a straight-sided section. Cycle gas enters the bottom of the reactor and passes upward through a gas distributor plate into a fluidized bed located in the straight-sided section of the vessel. The gas distributor plate serves to ensure proper gas distribution and to support the resin bed when gas flow is stopped.

Gas leaving the fluidized bed entrains resin particles. Most of these particles are disengaged as the gas passes through the expanded section where its velocity is reduced.

Unfortunately the utilization of certain type catalysts, referred to in said U.S. Patent as Type IV catalysts, as well as vanadium based catalysts are prone to cause sheeting (sheets) during production of polyolefins by polymerization of alpha olefins in the fluidized bed process.

In order to satisfy certain end use applications for ethylene resins, such as for film, injection molding and roto molding applications, these type catalysts, i.e., Type IV have been used. However, attempts to produce certain ethylene resins utilizing the Type IV catalysts or vanadium based catalysts supported on a porous silica substrate in certain fluid bed reactors, have not been entirely satisfactory from a practical commercial standpoint. This is primarily due to the formation of "sheets" in the reactor after a brief period of operation. The "sheets" can be characterized as constituting a fused polymeric material.

The sheets vary widely in size, but are similar in most respects. They are usually about ¼ to ½ inch thick and are from about one to five feet long, with a few specimens even longer. They have a width of about 3 inches to more than 18 inches. The sheets have a core composed of fused polymer which is oriented in the long direction of the sheets and their surfaces are covered with granular resin which has fused to the core. The edges of the sheets can have a hairy appearance from strands of fused polymer.

After a relatively short period of time during polymerization, sheets begin to appear in the reactor, and these sheets plug product discharge systems forcing shutdown of the reactor.

Accordingly, it will be seen that there presently exists a need to improve the polymerization techniques necessary for the production of polyolefin products utilizing titanium based catalysts in fluidized bed reactors.

It is therefore an object of the present invention to provide a process to substantially reduce or eliminate the amount of sheeting which occurs during the low pressure fluidized bed polymerization of alpha olefins utilizing titanium based compounds as catalyst.

These and other objects will become readily apparent from the following description taken in conjunction with the accompanying drawing which generally indicates a typical gas phase fluidized bed polymerization process for producing high density and low density polyolefins modified slightly however to illustrate the present process for reducing or eliminating sheeting.

SUMMARY OF THE INVENTION

Broadly contemplated the present invention provides an improvement in the method for polymerization of alpha-olefins in a reaction zone of a fluid bed reactor utilizing titanium based catalysts or other catalysts prone to cause sheeting during said polymerization and wherein a gaseous feed stream comprising monomer, comonomer, an inert gas and hydrogen are continuously passed through said fluidized bed under reactive and sheet forming conditions, withdrawing from said reaction zone polymer product and a recycle stream comprising unreacted gases and solid particles, cooling said recycle stream and recycling said cooled recycle stream to said reaction zone, the improvement comprising, reducing or substantially eliminating sheeting in said reactor by introducing said gaseous feed stream comprising monomer, comonomer, an inert gas and hydrogen into said recycle stream comprising unreacted gases and solid particles at a point prior to cooling of said stream, and thereafter cooling and directing said recycle stream and said gaseous feed stream into said reaction zone.

It has been found that the amount of static voltage generated by impurity addition to fluidized bed polymerization reactors is highly dependent upon the point of addition of the impurity to the cycle. The point of impurity addition that causes the greatest static response is directly into the fluid bed at the fluid stagnant zone. When impurities were injected into the cycle at a point far removed from the fluid bed, (such as upstream of the cycle gas cooler) the resulting static charging effect is greatly attenuated. Thus according to the present invention, by locating monomer, comonomer, nitrogen and hydrogen feedstreams to the process (these streams will contain static causing impurities on occasion) upstream of the cycle gas cooler, static charging is reduced. The reduction of static charging in the fluid bed results in better reactor performance by reducing the risk of sheet and chunk formation which are often the direct result of static electricity. According to this invention sheeting is minimized, and therefore resultant downtime to remove these sheets is also eliminated.

DETAILED DESCRIPTION OF THE INVENTION

Referring particularly to the sole FIGURE of the drawing, a conventional fluidized bed reaction system for polymerizing alpha olefins includes a reactor 10 which consists of a reaction zone 12 and a velocity reduction zone 14.

The reaction zone 12 includes a bed of growing polymer particles, formed polymer particles and a minor amount of catalyst particles fluidized by the continuous flow of polymerizable and modifying gaseous components in the form of make-up feed and recycle gas through the reaction zone. To maintain a viable fluidized bed, the mass gas flow rate through the bed is normally maintained above the minimum flow required for fluidization, and preferably from about 1.5 to about 10 tim $G_{mf}$ and more preferably from about 3 to about 6 times $G_{mf}$. $G_{mf}$ is used in the accepted form as the abbreviation for the minimum gas flow required to achieve fluidization, C. Y. Wen and Y. H. Yu, "Mechanics of Fluidization", Chemical Engineering Progress Symposium Series, Vol 62, p. 100–111 (1966).

It is highly desirable that the bed always contains particles to prevent the formation of localized "hot spots" and to entrap and distribute the particulate catalyst throughout the reaction zone. On start up, the reactor is usually charged with a base of particulate polymer particles before gas flow is initiated. Such particles may be identical in nature to the polymer to be formed or different therefrom. When different, they are withdrawn with the desired formed polymer articles as the first product. Eventually, a fluidized bed of the desired polymer particles supplants the start up bed.

The appropriate catalyst used in the fluidized bed is preferably stored for service in a reservoir 16 under a blanket of a gas which is inert to the stored material, such as nitrogen or argon.

Fluidization is achieved by a high rate of gas recycle to and through the bed, typically in the order of about 50 times the rate of feed of make up gas. The fluidized bed has the general appearance of a dense mass of viable particles in possible free-vortex flow as created by the percolation of gas through the bed. The pressure drop through the bed is equal to or slightly greater than the mass of the bed divided by the cross-sectional area. It is thus dependent on the geometry of the reactor.

Make-up gas is fed to the bed at a rate equal to the rate at which particulate polymer product is withdrawn. The composition of the make-up gas is determined by a gas analyzer 18 positioned above the bed. The gas analyzer determines the composition of the gas being recycled and the composition of the make-up gas is adjusted accordingly to maintain an essentially steady state gaseous composition within the reaction zone.

To insure complete fluidization, the recycle gas and, where desired, part or all of the make-up gas are returned to the reactor at base 20 below the bed. Gas distribution plate 22 positioned above the point of return ensures proper gas distribution and also supports the resin bed when gas flow is stopped.

The portion of the gas stream which does not react in the bed constitutes the recycle gas which is removed from the polymerization zone, preferably by passing it into velocity reduction zone 14 above the bed where entrained particles are given an opportunity to drop back in to the bed.

The recycle gas is then compressed in a compressor 24 and thereafter passed through a heat exchanger 26 wherein it is stripped of heat of reaction before it is returned to the bed. By constantly removing heat of reaction, no noticeable temperature gradient appears to exist within the upper portion of the bed. A temperature gradient will exist in the bottom of the bed in a layer of about 6 to 12 inches, between the temperature of the inlet gas and the temperature of the remainder of the bed. Thus, it has been observed that the bed acts to almost immediately adjust the temperature of the recycle gas above this bottom layer of the bed zone to make it conform to the temperature of the remainder of the bed thereby maintaining itself at an essentially conStant temperature under steady conditions. The recycle is then returned to the reactor at its base 20 and to the fluidized bed through distribution plate 22. The compressor 24 can also be placed downstream of heat exchanger 26.

Hydrogen may be used as a chain transfer agent for conventional polymerization reactions of the types contemplated herein. In the case where ethylene is used as a monomer the ratio of hydrogen/ethylene employed will vary between about 0 to about 2.0 moles of hydrogen per mole of the monomer in the gas stream.

According to the present invention the hydrogen, nitrogen monomer and comonomer feedstream (gas feed) are introduced into the gas recycle stream prior to the point where the recycle gas stream enter heat exchanger 26 such as through line 42.

Any gas inert to the catalyst and reactants can also be present in the gas stream. The cocatalyst is added to the gas recycle stream upstream of its connection with the reactor as from dispenser 28 through line 30.

As is well known, it is essential to operate the fluid bed reactor at a temperature below the sintering temperature of the polymer particles. Thus to insure that sintering will not occur, operating temperatures below sintering temperatures are desired. For the production of ethylene polymers an operating temperature of from about 90° C. to 100° C. is preferably used to prepare products having a density of about 0.94 to 0.97 while a temperature of about 75° C. to 95° C. is preferred for products having a density of about 0.91 to 0.94.

Normally the fluid bed reactor is operated at pressures of up to about 1000 psi, and is preferably operated at a pressure of from about 150 to 350 psi, with operation at the higher pressures in such ranges favoring heat transfer since an increase in pressure increases the unit volume heat capacity of the gas.

The catalyst is injected into the bed at a rate equal to its consumption at a point 32 which is above the distribution plate 22. A gas which is inert to the catalyst such as nitrogen or argon is used to carry the catalyst into the bed. Injecting the catalyst at a point above distribution plate 22 is an important feature. Since the catalysts normally used are highly active, injection into the area below the distribution plate may cause polymerization to begin there and eventually cause plugging of the distribution plate. Injection into the viable bed, instead, aids in distributing the catalyst throughout the bed and tends to preclude the formation of localized spots of high catalyst concentration which may result in the formation of "hot spots".

Under a given set of operating conditions, the fluidized bed is maintained at essentially a constant height by withdrawing a portion of the bed as product at a rate equal to the rate of formation of the particulate polymer product. Since the rate of heat generation is directly related to product formation, a measurement of the temperature rise of the gas across the reactor (the difference between inlet gas temperature and exit gas temperature) is determinative of the rate of the particulate polymer formation at a constant gas velocity.

The particulate polymer product is preferably withdrawn at a point 34 at or close to distribution plate 22. The particulate polymer product is conveniently and preferably withdrawn through the sequential operation of a pair of timed valves 36 and 38 defining a segregation zone 40. While valve 38 is closed, valve 36 is opened to emit a plug of gas and product to the zone 40 between it and valve 36 which is then closed. Valve 38 is then opened to deliver the product to an external recovery zone and after delivery, valve 38 is then closed to await the next product recovery operation.

Finally, the fluidized bed reactor is equipped with an adequate venting system to allow venting the bed during the start up and shut down. The reactor does not require the use of stirring means and/or wall scraping means.

The reactor vessel is normally constructed of carbon steel and is designed for the operating conditions stated above.

The polymers to which the present invention is primarily directed and which cause the sheeting problems above referred to in the presence of titanium or vanadium catalysts are linear homopolymers of ethylene or linear copolymers of a major mol percent ($\geq 90\%$) of ethylene, and a minor mol percent ($\leq 10\%$) of one or more $C_3$ to $C_8$ alpha olefins. The $C_3$ to $C_8$ alpha-olefins should not contain any branching on any of their carbon atoms which is closer than the fourth carbon atom. The preferred $C_3$ to $C_8$ alpha-olefins are propylene, butene-1, hexene-1, and octene-1. This description is not intended to exclude the use of this invention with alpha-olefin homopolymer and copolymer resins in which ethylene is not a monomer.

The homopolymers and copolymers have a density ranging from about 0.97 to 0.91. The density of the copolymer, at a given melt index level is primarily regulated by the amount of the $C_3$ to $C_8$ comonomer which is copolymerized with the ethylene. Thus, the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions. In the absence of the comonomer, the ethylene would homopolymerize.

The melt index of a homopolymer or copolymer is a reflection of its molecular weight. Polymers having a relatively high molecular weight, have relatively high viscosities and low melt index.

Having set forth the general nature of the invention, the following examples illustrate some specific embodiments of the invention. It is to be understood, however, that this invention is not limited to the examples, since the invention may be practiced by the use of various modifications.

Examples 1 and 2 are examples of conventional operations and were conducted in a fluidized bed reactor as described in the sole FIGURE of the drawing except that the gas feed was conventional i.e., the gas feed was introduced into the system in the line after the heat exchanger the line feeding into the bottom of the reactor.

EXAMPLE 1

A fluidized bed reactor was started up at operating conditions designed to produce a film grade low density ethylene copolymer product having a density of 0.918 g/cc, a melt index of 1.0 dg/mm, and a sticking temperature of 140° C. The reaction was started by feeding catalyst to a reactor precharged with a bed of granular resin similar to the product to be made. The catalyst was a mixture of 5.5 parts titanium tetrachloride, 8,5 parts magnesium chloride and 14 parts tetrahydrofuran deposited on 100 parts Davison grade 952 silica which had been dehydrated at 800° C. and treated with four parts triethylaluminum prior to deposition and was activated with thirty five parts tri-n-hexyl aluminum subsequent to deposition. Prior to starting catalyst feed, the reactor and resin bed were brought up to the operating temperature of 85° C., were purged of impurities by circulating nitrogen through the resin bed. Ethylene, butene and hydrogen concentrations were established at 53, 24, and 11% respectively. cocatalyst was fed at a rate of 0.3 parts triethylaluminum per part of catalyst.

Reactor start-up was normal. After producing product for 29 hours and equivalent to 6 ½ times the weight of the fluidized bed, temperature excursions of 1° to 2° C. above bed temperature were observed using thermocouples located just inside the reactor wall at an elevation of ½ reactor diameter above the gas distributor plate. Prior experience had shown that such temperature excursions are a positive indication that sheets of resin are being formed in the fluidized bed. Concurrently, bed voltage (measured using an electrostatic voltmeter connected to a ½ inch diameter spherical electrode located one inch from the reactor wall at an elevation of ½ reactor diameter above the gas distributor plate) increased from reading of approximately +1500 to +2000 volts to a reading of over +5000 volts and then dropped back to +2000 volts over a three minute period. Temperature and voltage excursions continued for approximately 12 hours and increased in frequency and magnitude. During this period, sheets of fused polyethylene resin began to show up in the resin product. Evidence of sheeting became more severe, i.e., temperature excursions increased to as high as 20° C. above bed temperature and stayed high for extended periods of time and voltage excursions also became more frequent. The reactor was shut down because of the extent of sheeting.

EXAMPLE 2

The fluidized bed reactor used in Example 1 was started up and operated to produce a linear low density ethylene copolymer suitable for extrusion or rotational molding and having a density of 0.934, a melt index of 5 and a sticking temperature of 118° C. The reaction was started by feeding catalyst similar to the catalyst in Example 1 except activated with 28 parts tri-n-hexylaluminum, to the reactor precharged with a bed of granular resin similar to the product to be made. Prior to starting catalyst feed the reactor and resin bed were brought up to the operating temperature of 85° C., and were purged of impurities with nitrogen. The concentrations of ethylene (52%), butene (14%), hydrogen (21%) were introduced into the reactor. Cocatalyst triethylaluminum was fed at 0.3 parts per part of catalyst. The reactor was operated continuously for 48 hours and during that period produced resin equivalent to 9 times the amount of resin contained in the bed. After this 48 hour period of smooth operation, sheets of fused resin began to come out of the reactor with the normal, granular product. At this time voltages measured ½ reactor diameter above the distributor plate averaged +2000 volts and ranged from 0 to +10,000 volts, while skin thermocouples at the same elevation indicated excursions of ≥15° C. above the bed temperature. Two hours after the first sheets were noted in the product from the reactor, it was necessary to stop feeding catalyst and cocatalyst to the reactor to reduce the resin production rate because sheets were plugging the resin discharge system. One hour later, catalyst and cocatalyst feeds were restarted. The production of sheets continued and after two hours catalyst and cocatalyst feed were again stopped and the reaction was terminated by injecting carbon monoxide. The voltage at this time, was ≥12,000 volts and the thermocouple excursions continued until the poison was injected. In total, the reactor was operated for 53 hours and produced 10½ bed volumes of resin before the reaction was stopped due to sheeting.

EXAMPLE 3

Continuous polymerization of ethylene was sustained in a fluidized bed reactor. A film-grade low-density copolymer having a density of 0.918 g/cm$^3$ and a melt index of 2.0 gd/min was produced by feeding catalyst and cocatalyst to the reactor. Catalyst consisted of a mixture of 5 parts $TiCl_3 \cdot \frac{1}{3}AlCl_3$, 7 parts $MgCl_2$, and 17 parts tetrahydrofuran deposited on 100 parts of Davison grade 955 silica which had been dehydrated at 600° C. and treated with 5.5 parts triethylaluminum prior to deposition and activated with 33 parts tri-n-hexylaluminum and 11 parts diethylaluminum chloride subsequent to deposition. The cocatalyst, triethylaluminum, was fed at a sufficient rate to maintain a molar ratio of Al to Ti of 40 to 1. The fluidized bed was maintained at a temperature of 85° C. Concentrations of ethylene, butene, and hydrogen in the reactor were 34, 11, and 8 mol percent, respectively. Copolymer resin was periodically withdrawn from the reactor in order to maintain a constant fluidized bed height within the reactor. Catalyst was fed directly into the fluidized bed; all other feeds were introduced into the gas recycle line upstream of both the heat exchanger and compressor.

Various quantities of either water vapor or oxygen in nitrogen were then continuously fed to the gas recycle line for periods of several hours at a time. The feed location was downstream of the compressor, upstream of the heat exchanger. The rates of introduction of water or oxygen are reported on a ppmw basis with respect to rate of removal of copolymer from the reactor. During their introduction, both inlet temperature of the cycle gas, measured below the fluidized bed, and static voltage in the bed were monitored. An increase of 1° C. in inlet temperature represented a loss in production rate of about 20%. Static voltage was measured by monitoring the voltage on a hemispherical steel probe located in the fluidized bed, one inch in from the inside wall, three bed diameters above the distributor plate. Measurements of catalyst activity and static are shown below:

| Impurity | Concentration ppmw | Catalyst Activity Change in Inlet Temp. °C. | Change in Magnitude of Static Level Volts |
|---|---|---|---|
| H$_2$O | 2.4 | No Change | No Change |
| H$_2$O | 4.8 | +0.7° | 50 |
| H$_2$O | 4.1 | +0.4° | 50 |
| O$_2$ | 3.0 | No Change | No Change |
| O$_2$ | 7.8 | +1.0° | No Change |

*Triethylaluminum was fed to recycle line downstream of heat exchanger.

Reactor operation remained smooth throughout these tests. This example shows that introduction of impurity levels up to 7.8 ppmw caused little or no static when the impurities were introduced into the recycle line upstream of the heat exchanger.

EXAMPLE 4

Continuous polymerization of ethylene was again sustained in a fluidized bed reactor. A high density copolymer having a resin density of 0.946 g/cm$^3$ and a flow index (190° C., 21.6 kg) of 9 dg/min was produced by feeding catalyst, cocatalyst, and promoter to the reactor. The catalyst was a mixture of 55 parts VCl$_3$, 1.5 parts diethylaluminum chloride, and 13 parts tetrahydrofuran deposited on 100 parts of Davison grade 953 silica which had been dehydrated at 600° C. Triethylaluminum was fed at a rate to maintain the molar ratio of Al to V at 40 to 1. Trichlorofluoromethane was fed between the compressor and heat exchanger at a molar ratio with respect to triethylaluminum of 0.75 to 1. The temperature of the fluidized bed was maintained at 100° C. Concentrations of ethylene, hexene, and hydrogen in the reactor were 73, 1, and 1.6 mol percent, respectively. Operation of the fluidized bed was otherwise similar to that in the previous Example.

One concentration of water vapor and two concentrations of oxygen were then introduced into the reactor, each for a several-hour period. These impurities were mixed with nitrogen and continuously introduced into the recycle gas at a point just downstream of the compressor, upstream of the heat exchanger. While each of these impurities was being fed to the recycle line, both catalyst activity and static were monitored as explained in the previous Example. Results were:

| Impurity | Concentration ppmw | Catalyst Activity Change in Inlet Temp. °C. | Change in Magnitude of Static Level Volts |
|---|---|---|---|
| H$_2$O | 4.0 | No Change | No Change |
| O$_2$ | 5.0 | No Change | 10 |
| O$_2$ | 9.0 | No Change | 50 |

Reactor operation remained good while these impurities were being fed. The results show that with a different catalyst system and different resin properties than in the previous Example, impurities introduced upstream of the heat exchanger at levels up to 9 ppmw again had little or no effect on static.

EXAMPLE 5

Continuous polymerization of ethylene was sustained in a fluidized bed reactor. A film grade low density copolymer having a density of 0.918 g/cm$^3$ and a melt index of 2.0 dg/min was produced by feeding catalyst and cocatalyst to the reactor. Catalyst consisted of a mixture of 5 parts $TiCl_3 \cdot \frac{1}{3} AlCl_3$, 7 parts $MgCl_2$, and 17 parts tetrahydrofuran deposited on 100 parts of Davison grade 955 silica which had been dehydrated at 600° C. and treated with 5.5 parts triethylaluminum prior to deposition and activated with 33 parts tri-n-hexylaluminum and 11 parts diethylaluminum chloride subsequent to deposition. The cocatalyst, triethylaluminum, was fed at a sufficient rate to maintain a molar ratio of Al to Ti of 30:1. The fluidized bed was maintained at 88° C. Concentrations of ethylene, butene and hydrogen in the reactor were 37, 12, and 9 mol %, respectively. Copolymer resin was periodically withdrawn from the reactor in order to maintain a constant fluidized bed height within the reactor. Catalyst was fed directly into the fluidized bed; all other feeds were introduced into the gas recycle line upstream of both heat exchanger and compressor.

A stream of nitrogen saturated with water vapor water was then fed to the reactor downstream of the compressor, upstream of the heat exchanger. The rate of water addition was in the amount of 20 ppm of water per part ethylene addition to the recycle stream. This water feed was added continuously for 2 and ½ hours and during this time there was no change in the static voltage potential in the fluidized bed. Static voltage remained at zero volts for the duration of the water addition. Static voltage was measured by monitoring the voltage on a hemispherical steel probe located in the fluidized bed, one inch in from the inside wall, three bed diameters above the distribution plate. The feed location of the saturated water stream was then transferred to just downstream of the heat exchanger. Water addition to this latter location was in the amount of 8 ppm water per part ethylene addition to the gas recycle. Upon introducing water to this new location downstream of the heat exchanger, negative static of −250 volts was generated immediately. Within ten minutes after water addition downstream of the heat exchanger, the temperature indicated by a wall thermocouple in the side of the polymerization reactor in the fluidized bed zone rose to 92° C., or 4° C. above bed temperature. This reading is indicative of sheet formation at this location at the wall in the fluidized bed.

EXAMPLE 6

Co-polymerization of ethylene and butene was sustained in a fluidized bed reactor. The product copolymer was a film grade resin of 0.918 grams/cm$^3$ and a melt index of 1 dg/min. The catalyst consisted of a mixture of 5 parts TiCl$_3$ ⅓ AlCl$_3$, 7 parts MgCl$_2$, and 17 parts tetrahydrofuran deposited on 100 parts of Davison grade 955 silica. The silica had been dehydrated at 600° C. and treated with 5.7 parts triethylaluminum prior to disposition and activated with 32 parts tri-n-hexyl aluminum and 11 parts diethylaluminum chloride subsequent to disposition. The catalyst triethylaluminum, was fed at a sufficient rate to maintain molar ratio of Al to Ti of 30 to 1. The fluidized bed was maintained at a temperature of 88° C. Concentrations of ethylene, butene, and hydrogen in the reactor were 46, 16, and 14 mole percent, respectively. Resin was periodically withdrawn from the reactor in order to maintain a constant fluidized bed height within the reactor. Catalyst was fed directly into the fluidized bed and all other feeds were introduced into the cycle gas stream downstream of both the compressor and heat exchanger.

Static voltage was measured in the fluidized bed by monitoring the voltage on a hemispherical steel probe located one inch from the inside wall, and one bed diameter above the distributor plate.

Water was then added to ethylene feed in the amount of 0.6 ppm on an ethylene feed basis. This water addition caused an immediate static voltage response in the fluidized bed from zero to −1600 volts.

The water addition point was then switched from downstream to upstream of the heat exchanger, and the negative static dissipated to zero volts almost immediately.

The water addition point was then toggled 3 more times between the heat exchanger inlet and discharge. On each occasion negative voltage appeared whenever water was fed to the heat exchanger outlet and the voltage dissipated immediately when the water was fed to the heat exchanger inlet. Water feed to the heat exchanger inlet in the amount of 0.8 ppm water per part ethylene feed to the recycle stream continuously for three hours caused no static voltage in the reactor.

EXAMPLE 7

The same reactor producing resin under the same conditions as in Example 6 was again used to test the effect of water feed location upon static on a separate occasion.

In this instance, water fed to the heat exchanger outlet in the amount of 0.3 ppm per part ethylene feed to the recycle caused −500 volts of static in the fluidized bed. When the feed location was switched to the heat exchanger inlet, water feed rates of up to 1.4 ppm per part ethylene feed caused no static in the fluidized bed. A continuous water feedrate of 1.2 ppm per part ethylene feed for four hours caused no static in the fluidized bed.

EXAMPLE 8

The same reactor producing copolymer resin under the same conditions as in Examples 6 and 7 was used to examine the effect of methanol feed location upon static voltage and sheeting in the fluidized bed.

In this case, nitrogen saturated with methanol at 20° C. was first fed to the heat exchanger outlet at a rate of 1.3 ppm methanol per part ethylene feed to the reactor recycle and the static voltage in the reactor immediately rose to +4000 volts. Simultaneously, a thermocouple measuring temperature at the inner wall of the reactor at a height of one plate diameter above the distributor plate rose from 86° C. to 94° C. indicating that a sheet was formed at this time. Since the reactor temperature was 88° C. at the time, any wall thermocouple reading in excess of 88° C. was indicative of sheet formation.

When the methanol feed was switched to upstream of the heat exchanger, static voltage dissipated to zero volts almost instantaneously. In addition no wall thermocouple excursions to above the temperature in the fluidized bed occurred when the methanol was fed upstream of the heat exchanger.

The methanol feed was toggled a total of 3 times between the heat exchanger outlet and inlet. In each case, positive static ranging from +700 to +4000 volts occurred immediately when methanol was fed downstream of the heat exchanger and static dissipated to zero, volts when methanol was fed upstream of the heat exchanger.

What is claimed is:

1. A method for reducing sheeting during the polymerization of alpha-olefins utilizing titanium based catalysts or other catalysts prone to cause sheeting in the presence of sheet forming amounts of water and oxygen as impurities said polymerization being conducted in a gas fluidized bed reactor which is associated with a recycle line for recycling a recycle stream comprising unreacted gases and solids; and cooling means and compressor means in said recycle line for cooling and compressing said recycle stream, which comprises introducing a gaseous feed stream comprising monomer, comonomer, an inert gas, hydrogen and sheet forming amounts of oxygen or water as impurities of said gaseous feed stream, at a point prior to cooling said recycle stream in said cooling means and thereafter cooling and directing said recycle stream and said gaseous feed stream into said reactor.

2. A method according to claim 1 wherein said recycle stream comprising unreacted gases and solid particles leaving said reaction zone are directed through a compressor and wherein said gaseous feed stream is introduced into said recycle stream at a point between said compressor and cooling of said recycle stream.

3. A method according to claim 1 wherein one of said alpha-olefins is ethylene.

4. A method according to claim 1 wherein said inert gas is nitrogen.

5. A method according to claim 1 wherein said catalyst prone to cause sheeting is a vanadium based catalyst.

6. A method according to claim 1 wherein said alpha-olefins are polymerized into polymers comprising linear copolymers of a major mol percent ($\geq 90\%$) of ethylene, and a minor mol percent ($\leq 10\%$) of one or more $C_3$ to $C_8$ alpha-olefins.

* * * * *